United States Patent [19]
Boccaccio

[11] Patent Number: 5,784,126
[45] Date of Patent: Jul. 21, 1998

[54] S-VIDEO SIGNAL LOSS COMPENSATION PROCESSING APPARATUS AND METHOD

[75] Inventor: Jeffrey Alan Boccaccio, Isle of Palms, S.C.

[73] Assignee: Gordon J. Gow Technologies, Inc., Orlando, Fla.

[21] Appl. No.: 709,200

[22] Filed: Aug. 27, 1996

[51] Int. Cl.⁶ ..................................................... H04N 9/64
[52] U.S. Cl. ......................... 348/708; 348/680; 348/712; 348/713; 348/679
[58] Field of Search ...................................... 348/679, 680, 348/712, 713, 673, 687, 708, 711; H04N 5/52, 9/64, 9/77

[56] References Cited
U.S. PATENT DOCUMENTS
4,376,288  3/1983  Shanley.

Primary Examiner—Sherrie Hsia
Attorney, Agent, or Firm—Allen, Dyer, Doppelt, Milbrath & Gilchrist, P.A.

[57] ABSTRACT

For an S-video signal, providing luminance and chrominance, luminance is amplified and adjusted over selected frequency ranges for shaping the S-video signal response for permitting the S-video signal to be transmitted over exceptionally long transmission lines while providing a quality picture. In separate channels, chrominance and luminance signals are amplified and impedance matched. A luminance band pass filter permits manual adjustments to a lower range of video signal frequencies and thus changes to white level picture information. A positive feedback network permits user adjustments in an upper video signal frequency range having picture super detail information for providing a picture of high resolution and thus pleasing to the user. A clear picture, brighter and sharper, rather than simply a brighter picture is available whether transmitted over a few or few hundred feet from a video source to the monitor.

38 Claims, 5 Drawing Sheets

S-VIDEO SIGNAL LOSS COMPENSATION PROCESSING APPARATUS AND METHOD

BACKGROUND OF INVENTION

1. Field of Invention

The present invention relates generally to an apparatus for transmitting an S-video signal from a video source over a transmission line having a length typically detrimental to the S-video signal and the processing of the S-video signal for enhancing the signal within selected frequency bands for overcoming transmission line loss. More particularly, the invention relates to the processing of chrominance and luminance signal components for enhancing brightness and resolution typically reduced through the transmission line loss.

2. Description of Background Art

Figure 1:
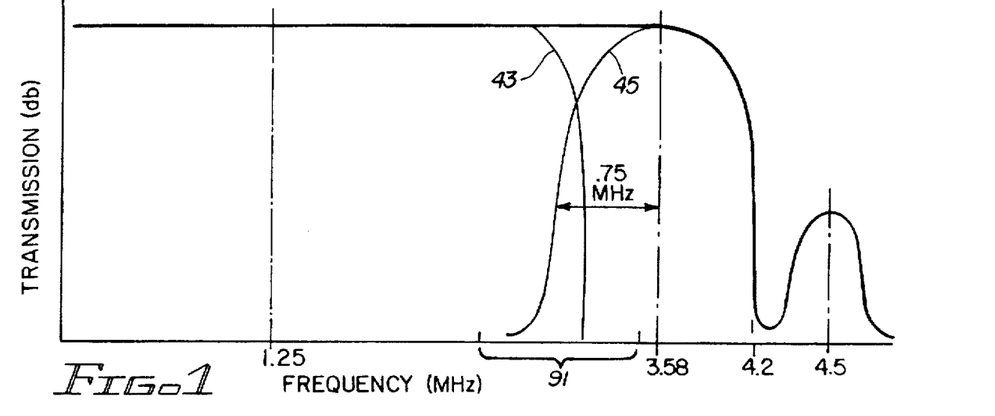
FIG. 1 is a standard FCC/NTSC frequency response (not to scale) for monochrome and color television picture transmission.

As is well known in the television and video industry, a composite video signal includes luminance and chrominance components that are combined or encoded, such as in an American standard signal established by the National Television System Committee (NTSC) of the Federal Communications Committee (FCC). By combining these signals, the quality of the final signal available is reduced because precise decoding for viewing a final image has yet to be achieved. The original frequency response parameters for the video signal specified in the NTSC standard required a total frequency response of 4.5 MHZ as illustrated with reference to FIG. 1. This includes all picture information for horizontal and vertical scanning, flyback for retrace, and sound. This does not take into account the 1.5 MHZ separation distance required between TV channels. The total system requires 6 MHZ. Further, the frequency response of a system is directly proportional to the amount of resolution available on an associated monitor screen. The higher the frequency, the smaller will be each picture element, and the better the resolution.

With the introduction of color, an additional bandwidth of approximately 1 MHZ was required. The standard required this color or chrominance information to have a frequency range between approximately 3 MHZ and 4.5 MHZ. This provided the color bandwidth needed but at the same time limited the upper end frequency response for luminance. Such requirements limit picture information changes in a "super detail" area. More and more, video equipment manufactures are developing new ways of using this standard information within video systems with a goal of achieving improved picture quality. The present invention, as will be herein described, addresses improving the picture information, especially in this super detail area, when transmitted over a long transmission line.

By way of example, instead of using the composite signal to provide picture information directly, the composite signal is processed for providing luminance and chrominance signals on separate signal channels. By separating the luminance and chrominance signals, interference and difficulty in controlling the picture detail is dramatically reduced.

As is well known in the art, chrominance defines the color information in a composite video signal and describes the hue and saturation of a picture, but not the brightness. The brightness and contrast are described by the luminance component of the signal. The luminance is a monochrome component of a color video signal. Compatible color systems present luminance values of an image in a signal which is essentially that of an equivalent monochrome transmission. The hue and saturation values of the image are transmitted on a color subcarrier wave located within a frequency band of the luminance signal, and is recoverable from it. By arranging scanning frequencies to be rigidly tied to the color subcarrier frequency, the spectrum components of the chrominance signal (hue and saturation) are interleaved in frequency with those of the luminance signal. Therefore, since the chrominance signal contains essentially no luminance information, it has no noticeable effect on monochrome reception. The chrominance signals are recovered in color receivers and are combined therein with the luminance signal to recreate the primary color video signals such as in the FCC/NTSC composite color signal.

Separating the luminance and chrominance signals improves picture quality but it is well known that such luminance and chrominance information is limited to transmission over cable lengths within a few meters before significant degradation of the signal information makes the picture unacceptable to the user or viewer. There is a need in the industry to provide for the transmission of such luminance and chrominance signal information over varying lengths of transmission cable or lines with the further feature of permitting the user to adjust the picture quality, determined by luminance and chrominance, to the taste of the user. There is a further need to be able to adjust for varying lengths of cable or transmission lines selected for the convenient of the user.

The frequency response for the video signal after being transmitted over significant transmission line lengths plays an important role. By way of example, consider the sensitivity of the video signal for systems using a frequency band width of 4.5 MHZ with different carrier video components needed to make up a complete video signal used by television. Picture, synchronization, sound, and color makes up this composite format. The scan rate frequency used is 15,750 Hz. During operation, this scanning frequency sweeps a dot along the face of a monitor picture tube varying the intensity of the dot proportional to the amplitude of the signal. The resolution defined by the quantity of dots that are displayed is directly proportional to the frequency response of this composite video envelope. In other words, a frequency response having higher frequencies will result in a sharper video image on the monitor.

By way of example, should the band width of the composite video signal be 3 MHZ, the actual resolution would be determined as follows: First, determine the time it takes for one line of picture information to travel from the left side of a monitor screen to the right side before retrace occurs. Since the scan frequency is 15,750 Hz, the time to complete one scan can be calculated by finding the reciprocal of the frequency, which is 63.3 micro seconds. Next, determine the time it takes for 3 MHZ to produce one picture element or 2 dots. One element is made up of movement through 2 dots. The same rule follows, take the reciprocal of 3 MHZ, which is 0.333 micro seconds. That is the time it takes to produce one element or 2 dots. This means that approximately 6 dots appear in one microsecond. Finally, multiply the 6 dots times the scan rate of 53.5 micro seconds (63.5 less 10 used for retrace) which provides the number of dots to go across the whole screen. The result is about 314 dots that can be scanned with one sweep trace at 3 MHZ.

Consider a video signal having a response with a frequency band width of 4 MHZ and redetermine the resolution. The reciprocal is 0.25 micro seconds. Again, it takes 2 dots to make up one element. That is 8 dots times 53.5 micro seconds and you get 426 dots of resolution. It is thus quite obvious how much frequency response can change the picture detail. More picture elements provide better the picture detail, but more picture elements demand more frequency bandwidth.

When color television was introduced in the 1950's, a certain amount of the video band width was sacrificed in order to accommodate the need for color information. By colorplexing or providing a matrix during the transmit procedure of video, the colors retrieved from the three color camera, (red, green, blue) are encoded to produce 2 sets of color sidebands, one labeled I and the other Q. These 2 color mixtures are transmitted together, one being 90 degrees out of phase with the other. Since the human eye sees fine picture elements in black and white, color need only satisfy viewing the large objects. The amount of bandwidth needed for I and Q was then limited to only 1.5 MHZ, as illustrated by the frequency range for the chrominance signal portion of the video signal of FIG. 1. This frequency band or range of frequencies is nowhere near the range needed for black and white information.

An interesting phenomenon occurs within the video envelope. Sidebands were created by the black and white information also. These sidebands produced empty clusters around the harmonics of the scan rate 15,750 Hz. As a result, voids are produced between these side band clusters that are not used. The decision was made to use one of these empty areas with a high enough harmonic frequency to keep most of the chrominance information away from the luminance signal. The frequency picked was 3,579,545 Hz (3.5 MHZ as illustrated with reference to FIG. 1). The high frequency response of the video luminance signal is therefore limited to approximately 3 MHZ. For television in the 50's, this was adequate. Keep in mind that when these decisions were being made, commercial television was primarily transmitted in black and white. Typical television sets had thirteen inch diagonal picture tubes or viewing screens. The need for "super resolution" did not have the importance that color transmission has as of this writing.

As television became more and more improved, improved bandwidth was desired. One way this could be accomplished was by separating the Chrominance and the Luminance signals and transmitting them separately. When these signals arrive at a receiving end, they can be routed without disturbing the original video envelope bandwidth. This procedure re-established the original video frequency response of 4.2 MHZ available from the NTSC system. This format was called Y/C or S. It is well known in the industry that high quality television products such as video monitors, laser disk players and DSS devices offer S video in a standard package.

However, the cable or transmission line used has a direct relationship to the signal produced and ultimate picture quality as viewed by the user. The S type video transmission cable that became a standard was small and produced an inadequate impedance match, high capacitance, and a high resistance which caused the video output, frequency response, and chrominance to be limited. The industry immediately discounted the idea of using the S-video signal because of the poor reliability and significant signal line loss. As laser discs, DVD, and DSS became more available, the need for improved resolution grew stronger. The S-video signal carried the high frequency component information for providing a picture pleasing to the viewer but it is this high frequency information that is quickly lost or degraded within relatively short cable transmission runs.

The present invention, an S-video signal enhancement and processing apparatus was developed to meet the ever increasing need for a quality color signal. By amplifying and shaping the frequency response rather than simply amplifying it as has been seen in the industry, an S-video signal can be transmitted over generally great lengths of transmission line or cable and still provide a quality picture pleasing to the viewer.

SUMMARY OF INVENTION

It is an object of the present invention to provide enhancement of an S-video signal, containing luminance and chrominance information, for delivering the enhanced signal over a transmission line selected by the viewer while providing a video signal for viewing on a monitor displaying an image pleasing to a viewer. It is further an object of the invention to provide a manually adjustable enhancement to the S-video signal for delivery of the signal over lengthy transmission cables without signal degradation. It is another object to increase luminance and chrominance signal levels typically reduced during transmission to levels available prior to transmission. It is further an object of the invention to provide transmission of a source video signal to a plurality of monitors while permitting adjustment of each signal for providing a pleasing picture on each monitor regardless of differing transmission line lengths between monitors and the video source. It is yet another object of the invention to alter the frequency response of the luminance signal for correcting for any signal loss resulting from the signal transmission.

The present invention includes a correction system for handling the tough demand for quality video signal transmission associated with S-video applications. With a video amplifier having a gain of 6 dB and varying luminance signal frequency response over a particular frequency range using a bandpass filter, an output luminance signal is provided that has gain and adjustment sufficient for delivering a quality signal over a transmission line to a monitor. With a preselected gain and preselected frequency response, it is now possible to transfer a luminance signal through transmission cable having lengths ranging upwards to 150 and 300 meters while being able to maintain excellent picture quality.

With a positive feedback signal across the amplifier and a high frequency band pass filters, both adjustable, a user can adjust the video receiver to the same quality one could achieve by using a one meter length of the highest quality cable. Further, basic off-the-shelf cable such as standard shielded telephone cable is successfully used to transmit the video signal. A positive feedback resistor (potentiometer) and capacitor network provides an increased signal amplitude to achieve a desirable high frequency response while a second resistor (potentiometer) and capacitor network produce an upper to mid range slope or adjustment in frequency response to accommodate white balance and detail for a strong mid to upper frequency response driver offering signal nourishment needed to produce a preferred S-video signal for a vivid picture after experiencing transmission line loss.

By cloning a preferred embodiment, as is described in the detailed description section of this specification, an S-video distribution system is provided. The input of the distribution system is coupled directly through input gain potentiometers for both chrominance and luminance signals. The constant value of the potentiometers used offer a fixed input impedance satisfying the incoming source. Since both luminance and chrominance are now adjustable, each monitor can be adjusted for luminance, chrominance, and resolution, keeping each monitor in check for quality. An additional summing amplifier is provided to reproduce a composite output to meet a need for this format in anticipated field use. Two amplifiers having unity gain buffer the incoming S signal for providing a slave output to run additional distribution systems. This gives the user multiple channels, slave channels, and composite channels. By using a one ampere power supply, the need for extra supplies for each system is eliminated.

These and other objects, features, and advantages of the invention are provided by a video signal processing apparatus for transmitting an S-video signal from a video source over a transmission line to a monitor, the S-video signal having luminance and chrominance signal components characterized within a frequency bandwidth. The apparatus comprises a luminance signal amplifier for amplifying an input luminance signal provided by a video source, the luminance signal amplifier providing an amplified luminance signal, a bandpass filter operatively connected to the amplifier for receiving the amplified luminance signal, the filter coupled with the amplifier for providing an output luminance signal having an enhanced signal frequency range lying within the video signal bandwidth, and a chrominance signal amplifier for amplifying an input chrominance signal provided by the video source, the chrominance signal amplifier providing an amplified output chrominance signal, wherein the output luminance signal and output chrominance signal in combination provide an S-video signal having electrically isolated luminance and chrominance signal portions. In one embodiment of the present invention, a luminance feedback network is operatively connected across the luminance signal amplifier for providing a feedback signal for amplifying by the luminance amplifier and combining with the amplified luminance signal for enhancing the luminance output signal frequency response. The feedback network affects the luminance output signal within a frequency range including upper video band width frequencies. The filter affects the luminance output signal within a lower video band width frequency range. The luminance output signal thus has a frequency response including the frequency signal bandwidth.

A method aspect of the invention includes transmitting an S-video signal provided by a video source to a monitor, the S-video signal having luminance and chrominance signal components characterized within a frequency bandwidth. The method comprises the steps of receiving a luminance signal and a chrominance signal, each having a frequency response defined within a video signal bandwidth, the luminance and chrominance signals providing an S-video signal representative of a video source picture signal, amplifying the luminance signal within a luminance signal channel, selecting a broad band of frequencies within the video signal bandwidth for transmission within the luminance signal channel, receiving a chrominance signal having a frequency response defined within the bandwidth, amplifying the chrominance signal within a chrominance signal channel electrically separated from the luminance signal channel, and transmitting the amplified luminance and chrominance signals over a transmission line to a monitor, the transmission line having separate luminance and chrominance signal conductors. In one method of the present invention, a feedback signal is provided within the luminance signal channel for adjustment of the amplified luminance signal, the feedback signal having a frequency response within a frequency range lying within the video signal bandwidth, the feedback signal frequency response covering a frequency range including upper video band width frequencies, and wherein the broad band selecting step includes selecting frequencies within a lower video band width frequency range.

For an embodiment of the present invention herein described, the frequency feedback signal includes a luminance signal having a frequency range between approximately 1 MHZ and 3.5 MHZ, and the feedback signal includes a luminance signal within a frequency range between approximately 2 MHZ and 4.5 MHZ.

BRIEF DESCRIPTION OF DRAWINGS

A preferred embodiment of the invention as well as alternate embodiments are described by way of example with reference to the accompanying drawings in which.

DETAILED DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 2:
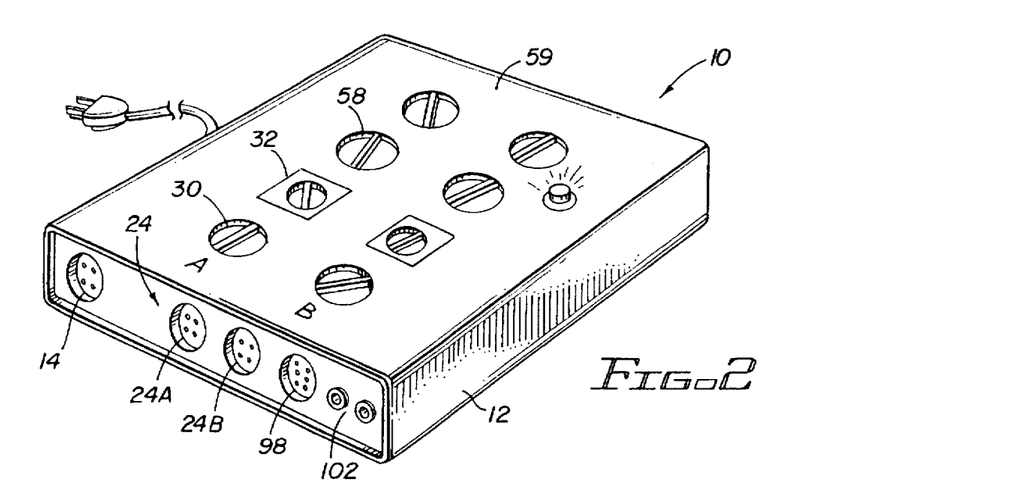
FIG. 2 is a perspective view of a preferred embodiment of the video signal processing apparatus of the present invention including an S-video input and multiple video outputs.
Figure 3:
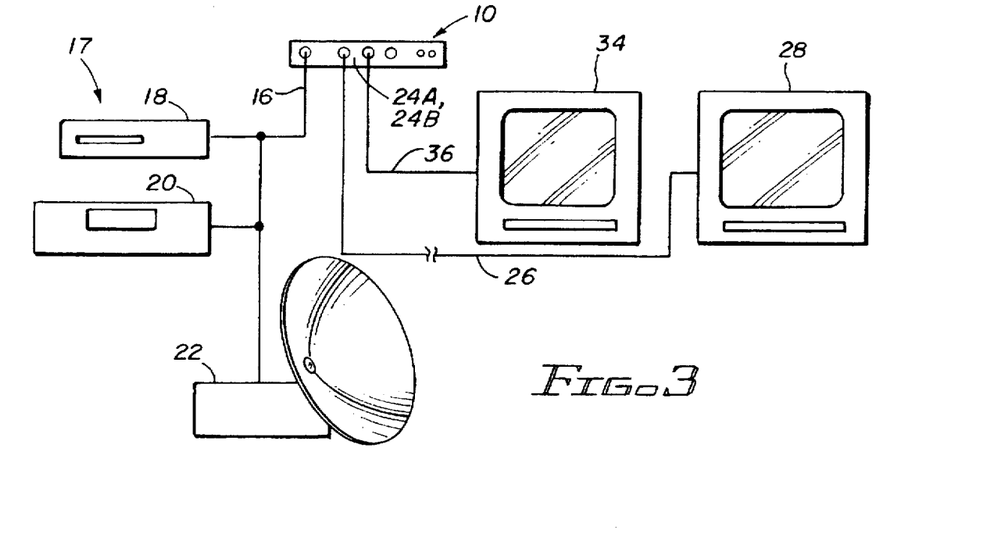
FIG. 3 is a schematic view of the video signal processing apparatus of FIG. 2 interfacing with a laser disk player, video disk player and digital satellite system, each able to provide a video signal in an S-video format.

Referring now to FIG. 2, a video signal processing apparatus 10 is provided within a housing 12 having input connector means including an input terminal 14 for receiving a cable 16 carrying an S-video signal from a video source 17 such as a video disk player 18, video tape player 20, or other systems 22 such as a digital satellite system (DSS), as illustrated with reference to FIG. 3. As will be further detailed, the apparatus 10, in one embodiment of the present invention provides multiple S-video signal outputs 24A and 24B for transmission of an enhanced signal over a lengthy transmission line 26 to a TV or video monitor 28 for viewing of a picture pleasing to a user. Based on a desired picture quality, the user makes manually adjustments to the luminance and chrominance signals, via gain controls 30, 32 carried by the housing 12, as will be described in further detail later in this section. It is anticipated that the apparatus 10 will be used to transmit luminance and chrominance video signals while compensating for signal line loss over transmission lines 26 having lengths ranging from a few meters to a few hundred meters. It is also anticipated that having a method for manually adjusting luminance and chrominance to ones taste even when the monitor 28 or a second monitor 34 is within less than a few meters, using a relatively short transmission line 36, will be desirable for the user.

Figure 4:
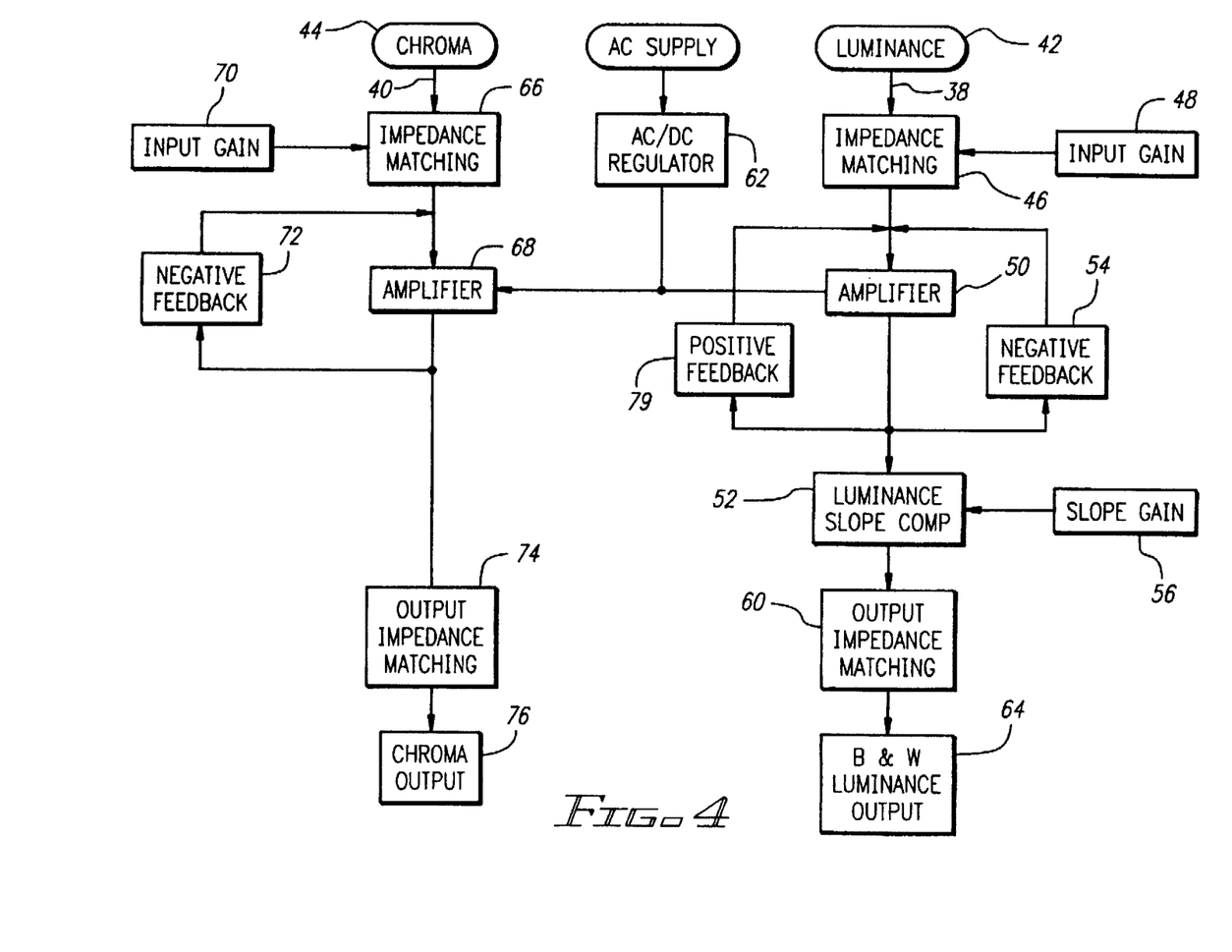
FIG. 4 is a functional block diagram illustrating operation of an embodiment of the present invention.
Figure 5:
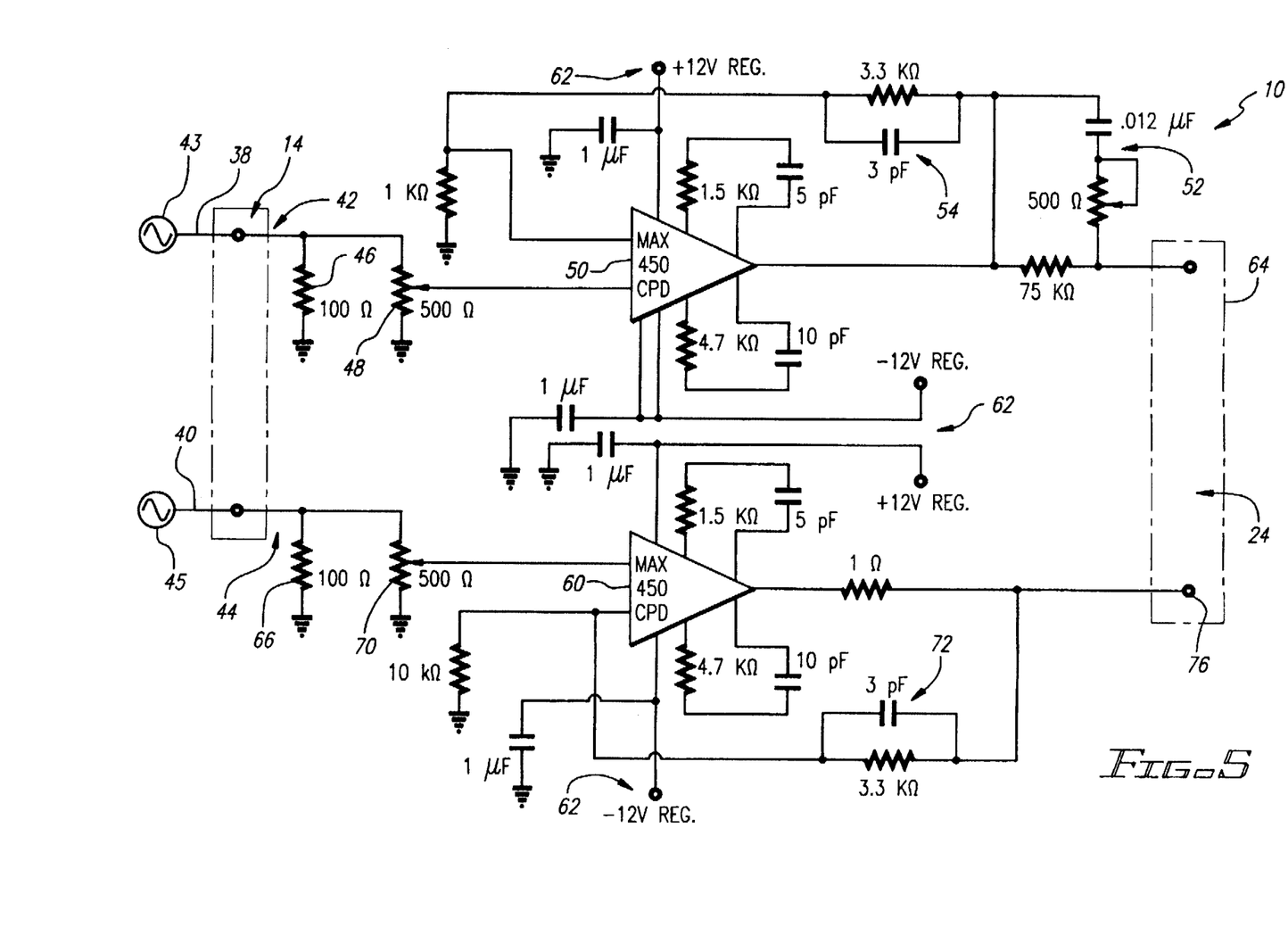
FIG. 5 is a schematic circuit diagram illustrating an embodiment of FIG. 4.

By way of example, and again with reference to FIG. 3, dual coaxial cable is preferred for use in transmission line 26, 36, one coaxial cable 38 for luminance signal transmission, the other coaxial cable 40 for chrominance signal transmission as illustrated in the functional block diagram of FIG. 4 and the schematic circuit diagram of FIG. 5. The apparatus 10 is designed to increase the amount of gain needed to restore luminance for providing a picture on the monitor 28 to a desirable level, increase the amount of gain needed to restore the chrominance to a desirable level, and alter the frequency response of the luminance signal to provide sufficient correction to overcome transmission line signal loss, especially in the picture detail.

As illustrated again with reference to FIGS. 4 and 5, a luminance channel 42 operates to receive a luminance signal 43 from the luminance coax input 38, and a chrominance channel 44 operates to receive a chrominance signal 45 from the chrominance coax input 40. The luminance signal 43 is processed through an impedance matching network 46 and signal level or gain control 48 before entering a luminance channel amplifier 50. In one embodiment of the present invention, the luminance amplifier 50 has a gain of two with a frequency response of 5 MHZ. The luminance amplifier 50 is carried by the housing 12 described earlier with reference to FIG. 2. The impedance matching network 46 sets up a preferred load characteristic for any video source 18, 20, 22 providing a source or input luminance signal 43 being introduced into the luminance channel 42 and thus the amplifier 50. This limits any standing wave ratio (SWR) that may occur. The signal level or gain control 48 provides an adjustment to an amount of luminance signal level needed for various loads and varying lengths of transmission line 26 selected by the user. This control is accessible by the user through the screw styled luminance control 30 described earlier with reference to FIG. 2. Again with reference to FIG. 5, the amplifier 50 in the embodiment herein described is a high gain, wide bandwidth amplifier type that has a gain of two overall. The gain is selected because it provides a good dynamic range over a noise level floor for the transmission line 26, 36 used and because of signal level losses resulting from incorporation of a slope compensation circuit 52 to be described in further detail later in this section. A high frequency negative feedback network 54 is used across the amplifier 50 to fix the gain to two and to add stability to the circuit at high frequency levels. The luminance slope compensation circuit 52 permits a frequency response for varying transmission line lengths from a short length, one meter by way of example, to long lengths, 100 meters for providing a smooth frequency response curve, as will be further detailed later in this section. Slope compensation gain control is provided by the compensation circuit 52, a filter network providing adjustment to the slope compensation based on the wire length and the picture quality desired by the user for the video source 18, 20, 22 being used. The luminance amplifier 50 output signal at circuit location 51, illustrated with reference again to FIG. 5, enters the slope compensation circuit 52 for modification of the frequency response sufficient to correct the response for degradation due to the transmission line losses. Slope gain adjustments are provided for the luminance control as screw styled pot adjustments 56, as illustrated again with reference to FIG. 2, and are readily accessible to the user. Again with reference to FIG. 5, output impedance matching resistor 60 provides a known load, illustrated herein by way of example, for the amplifier 50 in the event the amplifier 50 is shorted to ground when a power source 62 is provided to the amplifier 50. With such a luminance channel circuit, an adjustable black and white luminance output 64 is provided.

Again with reference to FIGS. 4 and 5, a chrominance channel 44 includes an impedance matching network 66 operating to set up a desired load characteristic for a source of chrominance signal 45 being introduced into the chrominance amplifier 68. A chrominance input gain control 70 varies the amount of chrominance signal level needed for the load and length of the line 26. As earlier described, a user has access to the gain control 70 through a screw styled pot adjustment chrominance control 32 on the housing 12 as illustrated again with reference to FIG. 2. In one preferred embodiment, the chrominance amplifier 68 is a 5 MHZ amplifier as was described for the luminance amplifier 50. A negative feedback circuit 72 maintains the chrominance gain to two, as illustrated with reference to FIGS. 4 and 5. Output impedance matching 74 is as described for the luminance matching 60. After amplifying the input chrominance signal 45, a chrominance output 76 having a frequency response within a frequency range of approximately 1 MHZ to approximately 3.58 MHZ is provided.

Figure 6:
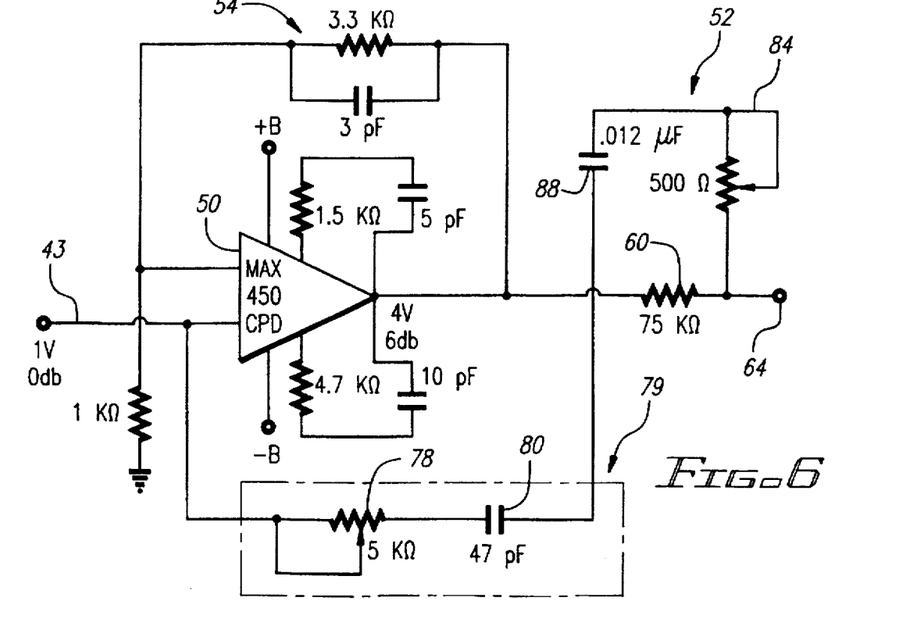
FIG. 6 is a schematic circuit diagram illustrating an alternate slope compensation embodiment of the present invention.
Figure 7:
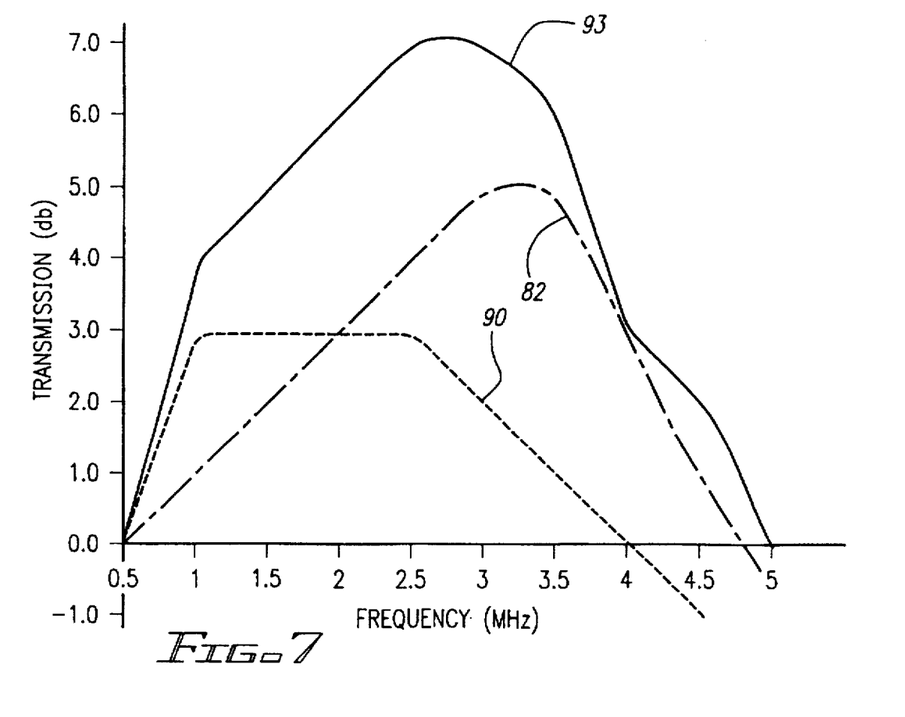
FIG. 7 is a frequency response plot illustrating frequency response enhancement for luminance correction when accommodating a long cable transmission.

In yet a further improvement to the circuit herein described with reference to FIG. 5, and to expand the luminance signal frequency response shaping capability, as well as provide further control for the user, the embodiment as illustrated with reference to FIG. 6 is provided, wherein the luminance video slope compensation operation as earlier described is expanded. After many hours of research with different cable types and lengths, and various video components, a correction system was produced to handle the tough demands for many S-video formatted applications. By building a video amplifier having a gain of 6 dB and forcing a frequency response contour that is variable over a particular frequency range, a luminance enhancement circuit, illustrated herein, by way of example, with reference to FIG. 6, provides such needed gain and signal frequency response enhancement or correction to the luminance input signal 43. With this gain and selected frequency response, as will be described with reference to FIG. 7, by way of example, it is now possible to transfer luminance signals over distances ranging from a few meters to a few hundred meters while still maintaining excellent picture quality.

Such a circuit takes advantage of the fact that a typical operational amplifier's frequency response is inversely proportional to the amplifier gain, thus, the higher the gain, the narrower the frequency response available for the amplified signal. By way of example with respect to the loads herein described, by using an amplifier having a gain of two and loading the output to the amplifier with 75 ohms, a frequency response roll off can be selected to meet preferred frequency cut off limits. By cascading a high pass filter to the output, the bandpass filter and gain needed for stability and transmission over long cable lengths is achieved.

Further with reference to FIG. 6, in addition to the frequency compensation earlier described for the slope compensation filter network 52, with reference to FIG. 5, extra positive feedback and filtering provided by the circuit 79, both manually adjustable, permit the user to adjust the picture viewed on the monitor 28, 34 to have the same quality one could achieve by using a one meter length of the highest quality cable. Further, cable as basic as standard shielded telephone cable is successfully used.

Again with reference to FIG. 6, the positive feedback network 79 includes a potentiometer 78 and capacitor 80 provide for adjustment to the high frequency spectrum range from approximately 2 MHZ to 4.5 MHZ. As illustrated with reference to FIG. 7, the network or circuit 79 provides a desirable high frequency response 82, while potentiometer 84 and capacitor 88, produce an upper to mid frequency range from approximately 1 MHZ to 3.5 MHZ to accommodate white level changes in the frequency response 90 for balance and detail in providing luminance signal nourishment needed to produce a high quality S-video signal 93, and thus producing a vivid picture. A clear picture, not simply a brighter picture is realized at the monitor.

Therefore, adjustment of potentiometer 84 of FIG. 6, a signal frequency filtering means permits, along with the amplifier and circuitry herein described, a luminance signal amplification and adjustment in a broad band frequency range and thus affects the first few hundred picture elements being scanned across the monitor screen. The positive feedback control network 79 in the specific frequency range or band width of approximately 2 MHZ to 4.5 MHZ provides selected brightness and sharpness control for each picture element rather than an overall brightness control as is typically provided. Such adjustment affects the additional picture elements over three hundred picture elements and provides adjustment in the "super detail" area 91 illustrated again with reference to FIG. 1.

Again with reference to FIG. 7, adjustments to the frequency response 90 are provided through adjustments in the potentiometer 84, and adjustments to the frequency response 82 are provided through the potentiometer 78 of the positive feedback circuit 79. Such controls are available to the user through the slope gain adjustment 58 and adjustment 59, earlier described with reference to FIG. 2. A set of control adjustments is provided for each channel (A and B). By way of example, therefore, a source video signal having a frequency response as illustrated with reference to FIG. 1, and the luminance signal 43, will be degraded when transmitted through the transmission line 26 or the transmission line 36. In the example described herein by way of example, the luminance signal 43 is amplified and its frequency response shaped to provide the enhanced luminance signal response 93 illustrated with reference to FIG. 7. By providing amplification and reshaping of the source signal, degradation of the signal through transmission line loss results in a luminance signal at the remote monitor that is representative of the original source video signal. It has been observed that, in some cases, an improved signal is provided when compared to the source signal.

Figure 8:
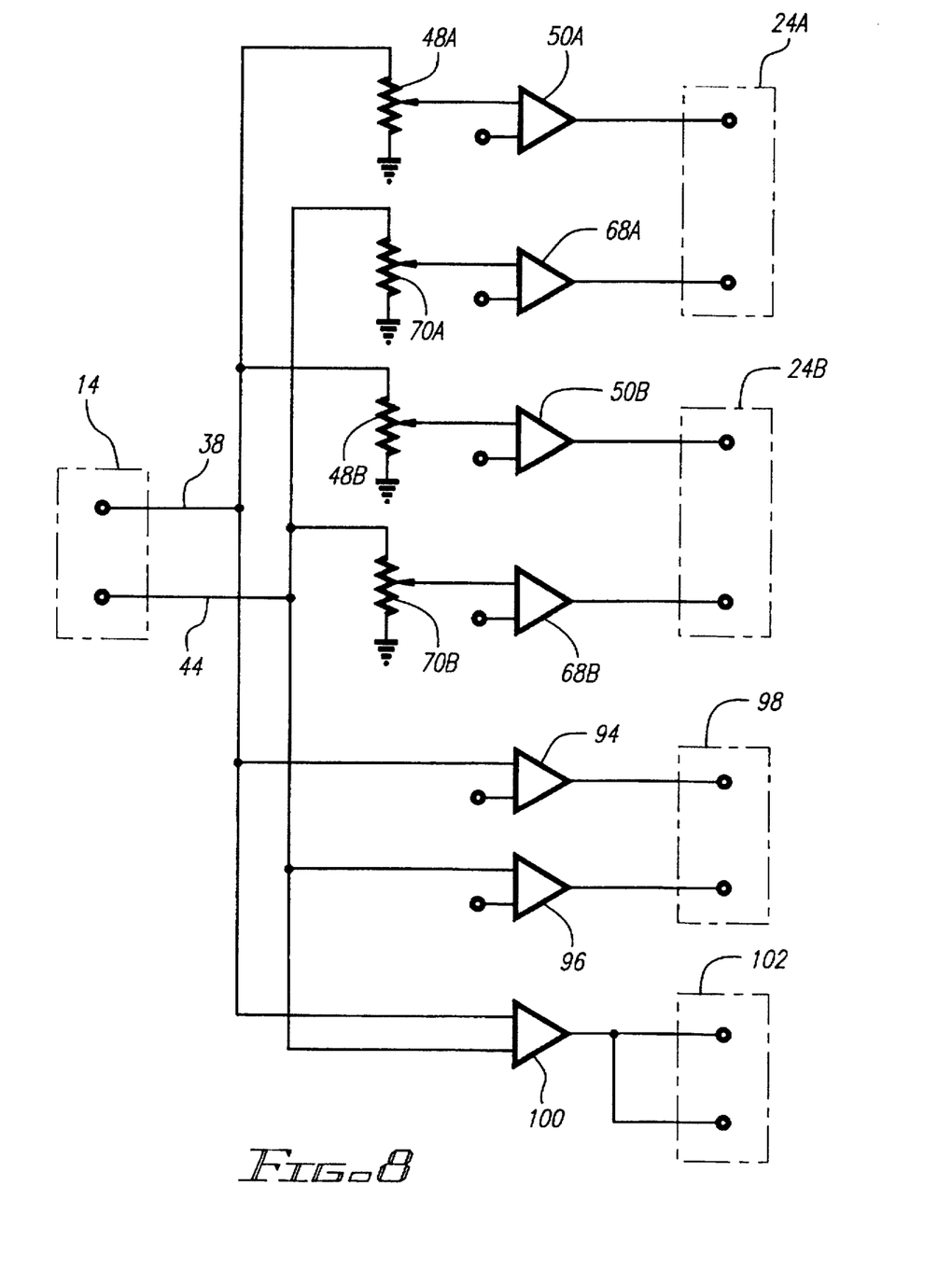
FIG. 8 a partial schematic circuit diagram of the embodiment of FIG. 2.

With reference to FIG. 8, and again to FIG. 2, by cloning the circuits described with reference to FIGS. 5 and 6, and having them carried by the housing 12, an S-video distribution system or apparatus 10 as herein described is provided. The input 14, as illustrated with reference to FIG. 8, is coupled directly through input gain potentiometers 48A, 48B, 70A, 70B for both luminance 38 and chrominance 44 signals of channels A and B having amplifiers 50A, 50B and chrominance amplifiers 68A, 68B, respectively. The constant value of the potentiometers offers a fixed input impedance satisfying the incoming source. Since both luminance and chrominance are now adjustable, each television or monitor 28, 34 can be adjusted independently for luminance, chrominance, and resolution, keeping each in check for quality. Two slave amplifiers 94, 96 are included in the apparatus 10 as unity gain amps designed to buffer the incoming luminance and chrominance S-video signal, and thus provide a slave output 98 to run up to 2 more distribution systems. Further, a summing amplifier 100 is provided to reproduce a composite output 102 to satisfy a need for such a composite signal. This would give the user a total of 6 individual channels, 3 slave channels, and 6 composite channels. By using a one amp power supply 62, as earlier described with reference to FIG. 4, the need for extra supplies for each system is eliminated.

The electronic component values identified with reference to FIGS. 5 and 6 are shown by way of example, and it is expected that alternate values will be used for meeting alternate matching and transmission needs. For example, the seventy five ohm resistor 60 was selected to match a particular load for the cable being used.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

What is claimed is:

1. A signal loss compensation method useful in transmitting an S-video signal through a transmission line from a video source to a video monitor, the S-video signal having luminance and chrominance signal components characterized by a frequency bandwidth, the method comprising the steps of:

receiving a luminance signal and a chrominance signal, each having a frequency response defined within a video signal bandwidth, the luminance and chrominance signals providing the S-video signal representative of a video source picture signal;

amplifying the luminance signal within a luminance signal channel;

providing a positive feedback signal within the luminance signal channel for adjustment of the amplified luminance signal, the feedback signal having a frequency response within a frequency range lying within the video signal bandwidth, the feedback signal frequency response covering the frequency range including upper video band width frequencies;

modifying a preselected band of frequencies within the video signal bandwidth for transmission of the luminance signal, wherein the preselected band of frequencies includes frequencies within a lower video band width frequency range;

amplifying the chrominance signal within a chrominance signal channel electrically separated from the luminance signal channel;

transmitting the amplified luminance and chrominance signals over the transmission line to the monitor, the transmission line having separate luminance and chrominance signal conductors.

2. An S-video signal transmission loss compensation method according to claim 1, wherein the modifying step enhances an operative luminance signal frequency response portion between approximately 1 MHZ and 3.5 MHZ, and the positive feedback providing step provides a luminance signal frequency response portion between approximately 2 MHZ and 4.5 MHZ.

3. An S-video signal transmission loss compensation method according to claim 1, further comprising the step of manually adjusting an amount of the luminance signal amplifying for transmitting the video signal to the video monitor pleasing to a user.

4. An S-video signal transmission loss compensation method according to claim 1, further comprising the step of manually adjusting the amount of feedback signal provided for transmitting the video signal to the video monitor pleasing to a user.

5. An S-video signal transmission loss compensation method according to claim 1, further comprising the steps of manually adjusting an amount of the luminance signal amplifying and manually adjusting the amount of feedback signal for transmitting the video signal to the monitor pleasing to a user, the manually adjusting steps shaping the luminance signal frequency response for compensating for transmission line signal loss affecting video picture brightness and sharpness of the transmitted signal, and thus the video picture.

6. An S-video signal transmission loss compensation method according to claim 1, further comprising the steps of:

splitting the luminance signal into multiple luminance signals and directing each signal into multiple luminance signal channels respectively, wherein the luminance signal amplifying step is made for each luminance channel, and wherein the positive feedback providing step is made within each of the luminance signal channels for independent channel adjusting of the amplified luminance signal for each channel;

splitting the chrominance signal into multiple chrominance signals and directing each signal into multiple chrominance signal channels respectively, wherein the chrominance signal amplifying step is made for each chrominance channel, each chrominance channel and each luminance channel electrically separated from each other; and delivering the amplified luminance and chrominance signals over separate transmission lines to multiple monitors, each transmission line having a distinctive length and electrical characteristic.

7. A signal loss compensation method useful in transmitting an S-video signal through a transmission line from a video source to a video monitor, the S-video signal having luminance and chrominance signal components characterized by a frequency bandwidth, the method comprising the steps of:

receiving a luminance signal and a chrominance signal, each having a frequency response defined within a video signal bandwidth, the luminance and chrominance signals providing the S-video signal representative of a video source picture signal;

amplifying the luminance signal within a luminance signal channel;

modifying a preselected band of frequencies within the video signal bandwidth for transmission of the luminance signal, wherein the preselected band of frequencies includes frequencies within a lower video band width frequency range;

amplifying the chrominance signal within a chrominance signal channel electrically separated from the luminance signal channel;

transmitting the amplified luminance and chrominance signals over the transmission line to the monitor, the transmission line having separate luminance and chrominance signal conductors.

8. An S-video signal transmission loss compensation method according to claim 7, further comprising the step of providing a positive feedback signal within the luminance signal channel for adjustment of the amplified luminance signal, the feedback signal having a frequency response within a frequency range lying within the video signal bandwidth, the feedback signal frequency response covering the frequency range including upper video band width frequencies.

9. An S-video signal transmission loss compensation method according to claim 7, wherein the modifying step enhances an operative luminance signal frequency response portion between approximately 1 MHZ and 3.5 MHZ.

10. An S-video signal transmission loss compensation method according to claim 8, wherein the positive feedback providing step provides a luminance signal frequency response portion between approximately 2 MHZ and 4.5 MHZ.

11. An S-video signal transmission loss compensation method according to claim 7, further comprising the step of manually adjusting an amount of the luminance signal amplifying for transmitting the video signal to the video monitor pleasing to a user.

12. An S-video signal transmission loss compensation method according to claim 8, further comprising the step of manually adjusting the amount of feedback signal provided for transmitting the video signal to the video monitor pleasing to a user.

13. An S-video signal transmission loss compensation method according to claim 8, further comprising the steps of:

splitting the luminance signal into multiple luminance signals and directing each signal into multiple luminance signal channels wherein the luminance amplifying step is made for each luminance channel, and wherein the positive feedback providing step is made within each of the luminance signal channels for independent channel adjusting in the amplifying luminance signal step for each channel;

splitting the chrominance signal into multiple chrominance signals and directing each signal into multiple chrominance signal channels, wherein the chrominance signal amplifying step is made for each chrominance channel, each chrominance channel and each luminance channel electrically separated from each other; and delivering amplified luminance and chrominance signals over separate transmission lines to multiple monitors, each transmission line having a distinctive length and electrical characteristic.

14. A signal loss compensation method useful in transmitting an S-video signal through a transmission line from a video source to a video monitor, the S-video signal having a luminance signal component characterized by a frequency bandwidth, the method comprising the steps of:

receiving a luminance signal and a chrominance signal, each having a frequency response defined within a video signal bandwidth, the luminance and chrominance signals providing the S-video signal representative of a video source picture signal;

amplifying the luminance signal within a luminance signal channel;

providing a positive feedback signal within the luminance signal channel for adjustment of the amplified luminance signal, the feedback signal having a frequency response within a frequency range lying within the video signal bandwidth, the feedback signal frequency response covering the frequency range including upper video band width frequencies; and modifying a preselected band of frequencies within the video signal bandwidth for transmission of the luminance signal, wherein the preselected band of frequencies includes frequencies within a lower video band width frequency range.

15. An S-video signal transmission loss compensation method according to claim 14, wherein the modifying step enhances an operative luminance signal frequency response portion between approximately 1 MHZ and 3.5 MHZ, and the positive feedback providing step provides a luminance signal frequency response portion between approximately 2 MHZ and 4.5 MHZ.

16. An S-video signal transmission loss compensation method according to claim 14, further comprising the step of manually adjusting an amount of the luminance signal amplifying for transmitting the video signal to the video monitor pleasing to a user.

17. An S-video signal transmission loss compensation method according to claim 14, further comprising the step of manually adjusting the amount of feedback signal provided for transmitting the video signal to the video monitor pleasing to a user.

18. An S-video signal transmission loss compensation method according to claim 14, further comprising the steps of manually adjusting an amount of the luminance signal amplifying and manually adjusting the amount of feedback signal for transmitting the video signal to the monitor pleasing to a user, the manually adjusting steps shaping the luminance signal frequency response for compensating for transmission line signal loss affecting video picture brightness and sharpness of the transmitted signal, and thus the video picture.

19. A video signal processing apparatus for transmitting an S-video signal over a transmission line from a video source to a video monitor, the S-video signal having luminance and chrominance signal components characterized within a frequency bandwidth, the apparatus comprising:

a housing;

input connector means carried by the housing for connection with the video source, the video source providing the S-video signal including an input luminance signal and an input chrominance signal;

output connector means carried by the housing for connection with the transmission line, the output connector means electrically isolating output luminance and output chrominance signals for isolated transmission of the output luminance and the output chrominance signals over the transmission line to the video monitor;

luminance signal amplifier means positioned within the housing for amplifying the input luminance signal;

luminance signal receiving means positioned within the housing and operatively coupled between the input connector means and the luminance signal amplifier means, the luminance signal receiving means for receiving the input luminance signal and impedance matching the input luminance signal with the luminance signal amplifier means, the input luminance signal having an operable frequency response characterized by a video signal bandwidth;

positive feedback signal means operable with the luminance signal amplifier means, the positive feedback signal means providing adjustment to an amplified luminance signal, the feedback signal means having a signal frequency response lying within the video signal bandwidth, the feedback signal means providing adjustment within an upper video frequency range;

amplified luminance signal modifying means positioned within the housing and operatively connected between the luminance signal amplifier means and the output connector means, the signal modifying means providing adjustment to the output luminance signal having a frequency range lying within the video signal bandwidth, the frequency range further lying within a lower video frequency range;

chrominance signal amplifier means positioned within the housing for amplifying the input chrominance signal and providing an amplified output chrominance signal; and chrominance signal receiving means positioned within the housing and operatively coupled between the input connector means and the chrominance signal amplifier means, the chrominance signal receiving means for receiving the input chrominance signal and impedance matching the input chrominance signal with the chrominance signal amplifier means, the chrominance signal having a frequency response defined within the video signal bandwidth, and wherein the output luminance signal and output chrominance signal in combination provide a modified S-video signal for delivery to the video monitor after experiencing transmission line loss within the transmission line wherein the modified S-video signal is representative of a video source picture signal.

20. A video signal processing apparatus according to claim 19, wherein the modifying means provides a luminance signal output first portion having a frequency response within a range between approximately 1 MHZ and 3.5 MHZ, and the positive feedback signal provides a luminance signal output second portion having a frequency response within a frequency range between approximately 2 MHZ and 4.5 MHZ.

21. A video signal processing apparatus according to claim 19, further comprising manual adjustment means carried by the housing and operable with the modifying means for varying the output luminance signal frequency response for providing the video signal at the monitor that is pleasing to a user.

22. A video signal processing apparatus according to claim 19, further comprising manual adjustment means carried by the housing and operable with the positive feedback signal means for varying the luminance signal frequency response for transmission of the output luminance signal over the transmission line for delivering a desired picture quality at the monitor.

23. A video signal processing apparatus for transmitting an S-video signal over a transmission line from a video source to a video monitor, the S-video signal having luminance and chrominance signal components characterized within a frequency bandwidth, the apparatus comprising:

a housing;

input connector means carried by the housing for connection with the video source, the video source providing the S-video signal including an input luminance signal and an input chrominance signal;

output connector means carried by the housing for connection with the transmission line, the output connector means electrically isolating output luminance and output chrominance signals for isolated transmission of the output luminance and output chrominance signals over the transmission line to the video monitor;

luminance signal amplifier means positioned within the housing for amplifying the input luminance signal;

luminance signal receiving means positioned within the housing and operatively coupled between the input connector means and the luminance signal amplifier means, the luminance signal receiving means for receiving the input luminance signal and impedance matching the input luminance signal with the luminance signal amplifier means, the input luminance signal having an operable frequency response characterized by a video signal bandwidth;

amplified luminance signal modifying means positioned within the housing and operatively connected between the luminance signal amplifier means and the output connector means, the signal modifying means providing adjustment to the output luminance signal having a frequency range lying within the video signal bandwidth;

chrominance signal amplifier means positioned within the housing for amplifying the input chrominance signal and providing an amplified output chrominance signal; and chrominance signal receiving means positioned within the housing and operatively coupled between the input connector means and the chrominance signal amplifier means, the chrominance signal receiving means for receiving the input chrominance signal and impedance matching the input chrominance signal with the chrominance signal amplifier means, the chrominance signal having a frequency response defined within the video signal bandwidth, and wherein the output luminance signal and output chrominance signal in combination provide a modified S-video signal for delivery to the video monitor after experiencing transmission line loss within the transmission line wherein the modified S-video signal is representative of a video source picture signal.

24. A video signal processing apparatus according to claim 23, further comprising positive feedback signal means operable with the luminance signal amplifier means, the positive feedback signal means providing adjustment to an amplified luminance signal, the feedback signal means having a signal frequency response lying within the video signal bandwidth, the feedback signal means providing adjustment within an upper video frequency range, the luminance signal modifying means further providing adjustment within a lower video frequency range.

25. A video signal processing apparatus according to claim 24, wherein the modifying means provides a luminance signal output first portion having a frequency response within a range between approximately 1 MHZ and 3.5 MHZ, and the positive feedback signal provides a luminance signal output second portion having a frequency response within a frequency range between approximately 2 MHZ and 4.5 MHZ.

26. A video signal processing apparatus according to claim 23, further comprising manual adjustment means carried by the housing and operable with the modifying means for varying the output luminance signal frequency response for providing the video signal at the monitor that is pleasing to a user.

27. A video signal processing apparatus according to claim 24, further comprising manual adjustment means carried by the housing and operable with the positive feedback signal means for varying the luminance signal frequency response for transmission of the output luminance signal over the transmission line for delivering a desired picture quality at the monitor.

28. A video signal processing apparatus for transmitting an S-video signal over a transmission line from a video source to a video monitor, the S-video signal having luminance and chrominance signal components characterized within a frequency bandwidth, the apparatus comprising:

a luminance signal amplifier for amplifying an input luminance signal provided by the video source, the luminance signal amplifier providing an amplified luminance signal;

a positive feedback signal circuit operably connected across the luminance signal amplifier for providing adjustment to the amplified luminance signal, the feedback signal circuit affecting the amplified luminance signal within a frequency response lying within a bandwidth of the video signal, the positive feedback signal circuit providing adjustment within an upper video frequency range;

an amplified luminance signal modifying circuit operatively connected to the luminance signal amplifier for providing adjustment to an output luminance signal having a frequency range lying within the video signal bandwidth, the frequency range further lying within a lower video frequency range; and a chrominance signal amplifier for amplifying an input chrominance signal provided by the video source and providing an amplified output chrominance signal, wherein the output luminance signal and output chrominance signal in combination provide a modified S-video signal for delivery to the video monitor after experiencing transmission line loss within the transmission line and wherein the modified S-video signal is representative of a video source picture signal.

29. A video signal processing apparatus according to claim 28, wherein the modifying circuit provides a luminance signal output first portion having a frequency response within a range between approximately 1 MHZ and 3.5 MHZ, and the positive feedback signal circuit a luminance signal output second portion having a frequency response within a frequency range between approximately 2 MHZ and 4.5 MHZ.

30. A video signal processing apparatus according to claim 28, further comprising a modifying circuit manual adjustment operable with the modifying circuit for varying the output luminance signal frequency response, and thus providing the video signal at the monitor that is pleasing to a user.

31. A video signal processing apparatus according to claim 28, further comprising a feedback circuit manual adjustment operable with the positive feedback signal circuit for varying the luminance signal frequency response for transmission of the output luminance signal over the transmission line, and thus delivering a desired picture quality at the monitor.

32. A video signal processing apparatus for transmitting an S-video signal over a transmission line from a video source to a video monitor, the S-video signal having luminance and chrominance signal components characterized within a frequency bandwidth, the apparatus comprising:

a luminance signal amplifier for amplifying an input luminance signal provided by the video source, the luminance signal amplifier providing an amplified luminance signal;

an amplified luminance signal modifying circuit operatively connected to the luminance signal amplifier for providing adjustment to an output luminance signal having a frequency range lying within a bandwidth of the video signal; and a chrominance signal amplifier for amplifying an input chrominance signal of the video source and providing an amplified output chrominance signal, wherein the output luminance signal and output chrominance signal in combination provide a modified S-video signal for delivery to the video monitor after experiencing transmission line loss within the transmission line wherein the modified S-video signal is representative of a video source picture signal.

33. A video signal processing apparatus according to claim 32, further comprising a positive feedback signal circuit operably connected across the luminance signal amplifier for providing adjustment to the amplified luminance signal, the feedback signal circuit affecting the amplified luminance signal within a frequency response lying within the video signal bandwidth, the feedback signal circuit providing adjustment within an upper video frequency range, and further, the modifying circuit affecting the frequency range lying within a lower video frequency range.

34. A video signal processing apparatus according to claim 33, wherein the modifying circuit provides a luminance signal output first portion having a frequency response within a range between approximately 1 MHZ and 3.5 MHZ, and the positive feedback signal circuit a luminance signal output second portion having a frequency response within a frequency range between approximately 2 MHZ and 4.5 MHZ.

35. A video signal processing apparatus for transmitting an S-video signal over a transmission line from a video source to a video monitor, the S-video signal having a luminance signal component characterized within a frequency bandwidth, the apparatus comprising:

- a luminance signal amplifier for amplifying an input luminance signal provided by the video source, the luminance signal amplifier providing an amplified luminance signal;
- a positive feedback signal circuit operably connected across the luminance signal amplifier for providing adjustment to the amplified luminance signal, the feedback signal circuit affecting the amplified luminance signal within a frequency response lying within a bandwidth of the video signal, the feedback signal circuit providing adjustment within an upper video frequency range; and
- an amplified luminance signal modifying circuit operatively connected to the luminance signal amplifier for providing adjustment to an output luminance signal having a frequency range lying within the video signal bandwidth, the frequency range further lying within a lower video frequency range.

36. A video signal processing apparatus according to claim 35, wherein the modifying circuit provides a luminance signal output first portion having a frequency response within a range between approximately 1 MHZ and 3.5 MHZ, and the positive feedback signal circuit a luminance signal output second portion having a frequency response within a frequency range between approximately 2 MHZ and 4.5 MHZ.

37. A video signal processing apparatus according to claim 35, further comprising a modifying circuit manual adjustment operable with the modifying circuit for varying a frequency response of the output luminance signal, and thus providing a modified video signal at the monitor that is pleasing to a user.

38. A video signal processing apparatus according to claim 35, further comprising a feedback circuit manual adjustment operable with the positive feedback signal circuit for varying the luminance signal frequency response for transmission of the output luminance signal over the transmission line, and thus delivering a desired picture quality at the monitor.

* * * * *